(12) United States Patent
Baverel et al.

(10) Patent No.: US 7,939,761 B2
(45) Date of Patent: May 10, 2011

(54) METHOD AND DEVICE FOR MANUFACTURING AN ASSEMBLY OF TWO RINGED SHEATHS THAT CAN BE DETACHED FROM ONE ANOTHER TO MAKE A SINGLE RINGED SHEATH

(75) Inventors: Christophe Baverel, Trevenans (FR); Benoit Remy, Sancey le Grand (FR)

(73) Assignee: Delfingen FR-Anteuil S.A., Anteuil (FR)

( * ) Notice: Subject to any disclaimer, the term of this patent is extended or adjusted under 35 U.S.C. 154(b) by 112 days.

(21) Appl. No.: 12/252,476

(22) Filed: Oct. 16, 2008

(65) Prior Publication Data
US 2009/0096126 A1 Apr. 16, 2009

Related U.S. Application Data

(63) Continuation of application No. PCT/EP2007/003154, filed on Apr. 10, 2007.

(30) Foreign Application Priority Data

Apr. 18, 2006 (FR) ...................................... 06 03386

(51) Int. Cl.
*H02G 15/08* (2006.01)
(52) U.S. Cl. .......................................... 174/93; 174/95
(58) Field of Classification Search .................. 174/95, 174/97, 102 D, 93; 285/124.5; 138/118.1
See application file for complete search history.

(56) References Cited

U.S. PATENT DOCUMENTS
2,043,044 A * 6/1936 Knoderer .................. 174/102 D

FOREIGN PATENT DOCUMENTS

| DE | 19641421 | | 10/1996 |
|---|---|---|---|
| DE | 10359377 | | 2/2005 |
| EP | 0268869 | | 6/1988 |
| JP | 2000-115942 | * | 4/2000 |
| NL | 100125 | | 1/1962 |

* cited by examiner

*Primary Examiner* — Chau N Nguyen
(74) *Attorney, Agent, or Firm* — Sturm & Fix LLP

(57) ABSTRACT

Method for manufacturing an assembly of two ringed sheaths (1,2) ready to be used to make a single ringed sheath around for example a bundle of electric cables (13), wherein two smooth-walled tubes are simultaneously extruded using a single extruder fitted with two extrusion nozzles, the two smooth-walled tubes are simultaneously molded into two ringed wall tubes using a molder equipped with molds each fitted with two ringed profiles extending in parallel in a longitudinal direction and being paired along one and the same parting line. According to the invention, during molding, material bridges (33) and empty spaces (35) are created between first tube rings (41) and second tube rings (42), by opening or closing respectively, between the two ringed profiles, material runs formed in the parting line of two paired molds, a longitudinal strip (28) of ringed tube wall is cut out and removed, using cutting means and the two ringed tubes connected to each other by the material bridges (33) formed between the rings are cut to a desired length, using severing means.

10 Claims, 6 Drawing Sheets

METHOD AND DEVICE FOR MANUFACTURING AN ASSEMBLY OF TWO RINGED SHEATHS THAT CAN BE DETACHED FROM ONE ANOTHER TO MAKE A SINGLE RINGED SHEATH

CROSS REFERENCE TO RELATED APPLICATIONS

This application is a Continuation application of PCT/EP2007/003154 filed Apr. 10, 2007, claiming priority of FR 0603386 filed Apr. 18, 2006, which are incorporated by reference herein in their entirety.

BACKGROUND OF THE INVENTION

1. Field of the Invention

The present invention relates to a method and a device for manufacturing an assembly of two ringed sheaths that can be detached from one another to make a single ringed sheath around a bundle of electric cables for example.

More specifically, in the method of the invention, two smooth-walled tubes are simultaneously extruded using an extruder fitted with two extrusion nozzles and the two smooth-walled tubes are simultaneously moulded into two ringed-wall tubes using a moulder equipped with moulds each fitted with two ringed profiles extending in parallel in a longitudinal direction and being paired along the same mating plane.

2. Description of the Related Art

It will be remembered that the bundle of electric cables which is provided in a car conventionally constitutes electric wires with a round cross-section, assembled in wire strands. Once these strands have been formed, the bundle is provided with various protective elements, before being fixed onto different elements of the vehicle, such as the engine and the car body.

Ringed tubular sheaths are one of the types of protection for bundles of electric cables commonly used in the car industry. The ringed tubular sheaths, formed by moulding an extruded tube into a succession of rings, are usually produced from extruded plastics materials, such as polypropylene, polyamide or polyesters. These sheaths provide a high resistance to abrasion and crushing, while maintaining a high level of flexibility which facilitates the production and packaging of the protected cabling, and the installation thereof in the vehicle. However, it is difficult to thread the strand within the ringed sheath, in particular in long portions. This is why split ringed sheaths are often used, i.e. ones which are cut along a straight longitudinal line at the end of the production process. It is thus possible subsequently to introduce electric wires and cables directly into any region of the sheath through the split.

The split ringed sheaths may include more or less complex closing systems so as to prevent the tube from allowing wires to escape in regions where the split tends to reopen. Document DE 196 41 421 in particular discloses a sheath of this type. These closing systems have been found to be relatively ineffective in regions with low radii of curvature.

Equally, the split ringed sheaths may be completely strapped up once they have been positioned on the bundle of cables, and this effectively locks the split, but requires an additional operation from the person laying the cables.

Another solution involves using an assembly of two sheaths as described in document EP 0 268 869: in this technique, the assembly consists of a first split ringed sheath positioned on the bundle of electric cables which is to be protected, and a second split ringed sheath of a greater diameter in which the first ringed sheath is housed. However, the use of an assembly of two separate elements complicates the arrangement, the cut along the protective covering, and the mounting operations for the person laying the cables.

SUMMARY OF THE INVENTION

The present invention therefore resolves these difficulties by proposing a method and device for manufacturing an assembly of two ringed sheaths that can be detached from one another to make a single ringed sheath.

Thus, the invention relates to a method of the type recalled above, characterised in that during moulding, material bridges and empty spaces are created between rings of the first tube and rings of the second tube, by opening or closing respectively, between the two ringed profiles, material passages formed in the mating plane of two paired moulds, a longitudinal strip of ringed tube wall is cut out and removed using cutting means, and the two ringed tubes, which are interconnected by the material bridges formed between the rings, are cut to a desired length using severing means.

A first cut-out internal ringed sheath is placed on the cabling which is to be protected. The second cut-out external ringed sheath is thus detached from the first and then placed thereon. The external ringed sheath largely covers the internal ringed sheath in such a way as to prevent cables from escaping, in particular when the bundle of cables passes into regions with a low radius of curvature. This double protective sheath is an advantageous replacement for the existing solutions, guaranteeing protection of the cables in regions with a low radius of curvature while simplifying the management of part numbers, the longitudinal cut, and the installation operations for the person laying the cables, as the two cut-out sheaths remain connected until the final operation of covering the internal sheath with the external sheath.

The invention further relates to a device for implementing a method according to the invention, comprising a single extruder fitted with two extrusion nozzles for simultaneously extruding two smooth-walled tubes, a moulder equipped with moulds each fitted with two ringed profiles extending in parallel in a longitudinal direction and being paired along the same mating plane, for simultaneously moulding the two smooth-walled tubes into two ringed-wall tubes, characterised in that the two ringed profiles of two paired moulds comprise clear spaces formed in an indented manner relative to portions coming into contact with one another in the mating plane, so as to form respectively, during moulding, material bridges and empty spaces between the rings formed in the first tube and the rings formed in the second tube, means being provided for cutting out and removing a longitudinal strip of ringed tube wall and for cutting to a desired length the two ringed tubes, which are interconnected by the material bridges formed between the rings.

Preferably, the clear spaces which allow material to pass into the mating plane are located in a part of the two ringed profiles of each mould which moulds a peak of the rings, whereas the portions which come into contact with one another to obstruct the passage of material into the mating plane are located in a part of the two ringed profiles which moulds a trough between two peaks of the rings.

The invention will be better understood from the following drawings, which are given by way of non-limiting example.

DETAILED DESCRIPTION OF THE PREFERRED EMBODIMENT

Figure 1:
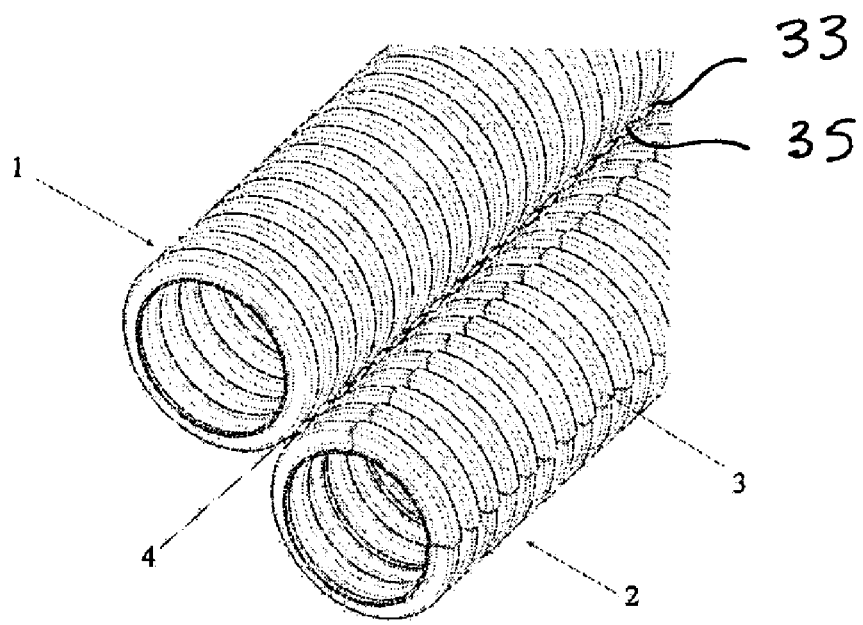
FIG. 1 shows the ringed sheaths which have been extruded together and which are connected at the tops of the rings thereof.

In one embodiment of the invention, with reference to FIGS. 1, 7, 8, 9, 10 and 12, the protective sheath 12 is obtained by double extrusion of two ringed sheaths 1, 2, an intermittent material connection 4 alternating between material bridges 33 and empty spaces 35 and continuing to connect these two sheaths at a low thickness along a longitudinal axis after extrusion. Preferably, this connection 4 connects the two ringed sheaths 1, 2 only at the peaks 51, 52 of the respective rings 41, 42 thereof between two troughs 61, 62. Two material strips 9 are respectively removed from the two sheaths 1, 2, in order to allow the internal sheath 2 to be placed easily on the cabling 13 which is to be protected, and to allow the external sheath 1 to cover the internal sheath 2. Preferably, the shape and diameter of the internal sheath 2 are adapted so as to allow an optimal position thereof in the external sheath 1, the external height and width of the rings thereof being slightly lower than the internal height and width of the rings of the external sheath 1.

With reference to FIGS. 2, 3, 4, 5 and 6, the connection 4 is obtained by allowing the material to pass in a limited manner between the internal tube and the external tube during mounting. Each shell, or mould, is thus constructed in such a way as to allow the material to circulate through passages formed between the tops of the rings of the sheaths which have been extruded together. The connection 4 must allow the two ringed sheaths 1, 2 to remain connected during the transport thereof, the packaging thereof, and the initial operations of mounting on the bundle of cables. However, said connection must not be too resistant, so as to allow each operator to separate the two ringed sheaths 1, 2 easily. It is likewise important that the material bridges 33 of the connection, located at the peaks 51, 52 of the rings 51, 42, are not too prominent after separation, so that the protective sheath 12 is not too abrasive against other elements. For this purpose, it is proposed to form a connection 4 alternating between material bridges and empty spaces in such a way that the force necessary for separating the two ringed sheaths 1, 2 is between 8 N and 20 N for each engagement point at the tops of the rings of these two sheaths 4.

In order to obtain these values, with reference to FIGS. 3, 4, 5 and 6, it is possible to vary different parameters in the shape of the shell which is intended for moulding, such as the length of the connection 23, the width 24 thereof, and the depth of the clear space 21 which is indented relative to the portions 22 which come into contact with one another in the mating plane 27 of two paired shells. In order to make it easier for the material to pass in the region of a connection, chamfers 26 are also provided.

By way of example, assuming a protective sheath 12 with an internal diameter of 22.90 mm, an external diameter of 28.6 mm, a width of 2.8 mm for the rings, and a space between two rings of 4.8 mm, it is preferable to use shells with a length of 2.2 mm for the connection 14, and a width 15 of 0.5 mm. The connection has chamfers 16 at 45° in the depth thereof.

A depth for the clear space 21 of 0.25 mm, to which are added chamfers 26 of 0.2 mm on the sides, allows an average tear-off force of 9.6 N to be obtained for an engagement point. A depth of 0.35 mm, to which are added chamfers 26 of 0.1 mm on the sides, specifically allows an average tear-off force of 11.1 N to be obtained for a connection. A depth of 0.35 mm, to which are added chamfers 26 of 0.2 mm on the sides, specifically allows an average tear-off force of 16 N to be obtained for a connection. A depth of the connection of 0.45 mm, to which are added chamfers 26 of 0.1 mm on the sides, specifically allows an average tear-off force of 18.8 N to be obtained for a connection.

These values are given only by way of non-limiting example and must be adapted to the shape of the protective sheath 12.

Figure 2:
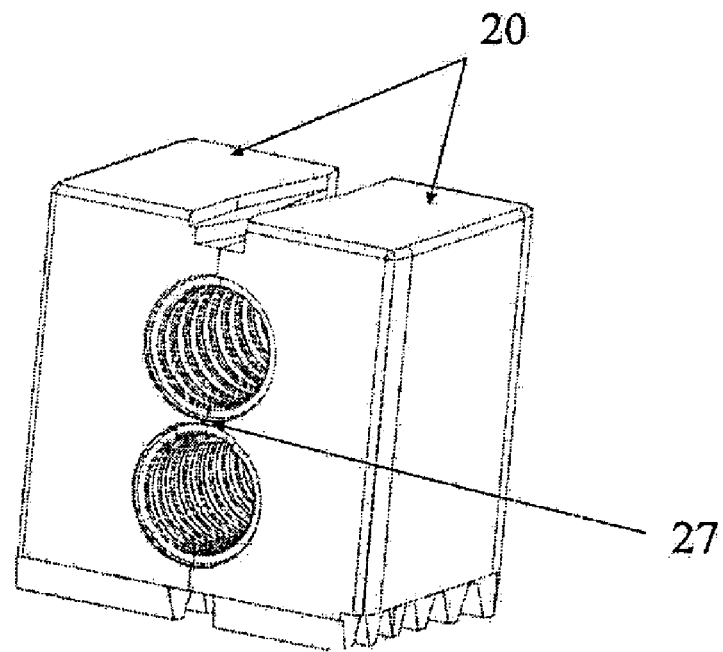
FIG. 2 shows two half-shells which mould the ringed sheaths which are connected at the tops of the respective rings thereof.
Figure 3:
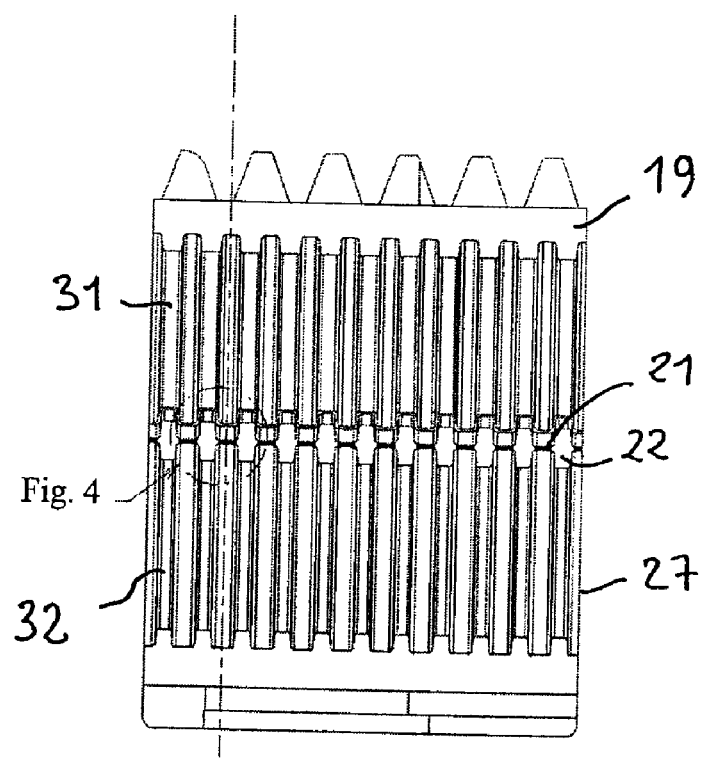
FIG. 3 is a front view of a half-shell.
Figure 4:
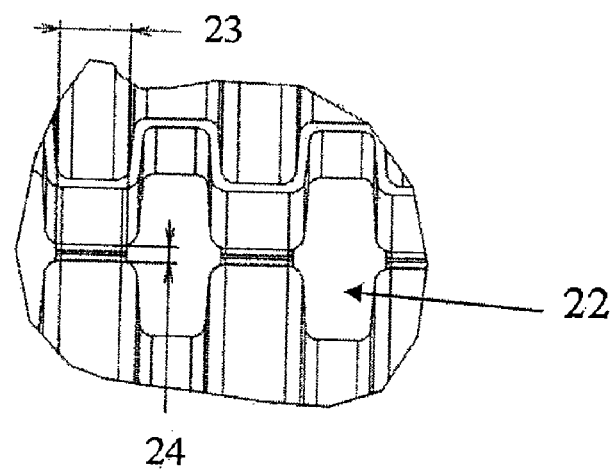
FIG. 4 is an enlarged front view of this shell at the connection between the tops of the rings of the ringed sheaths.
Figure 5:
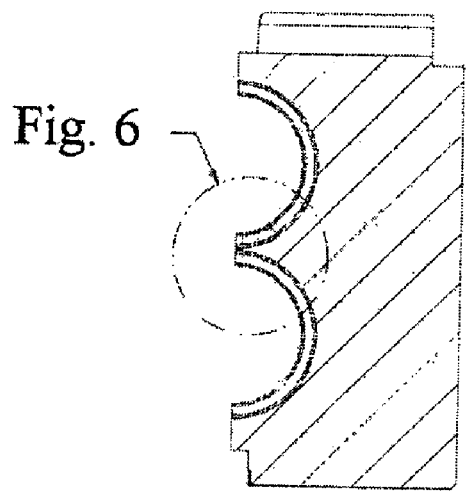
FIG. 5 is a cross-section of a half-shell.
Figure 6:
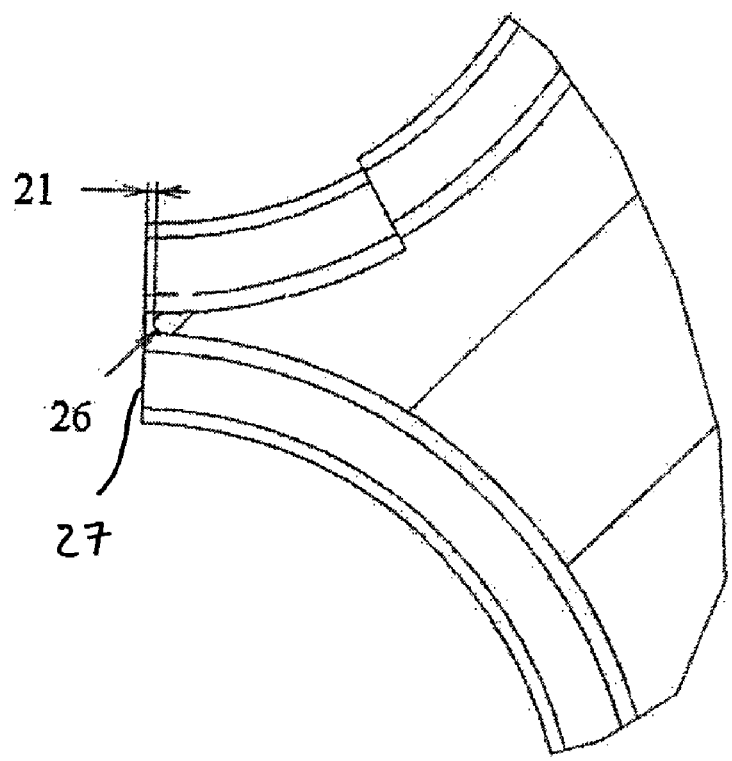
FIG. 6 is an enlarged view of this cross-section at the connection between the tops of the rings of the ringed sheaths.
Figure 8:
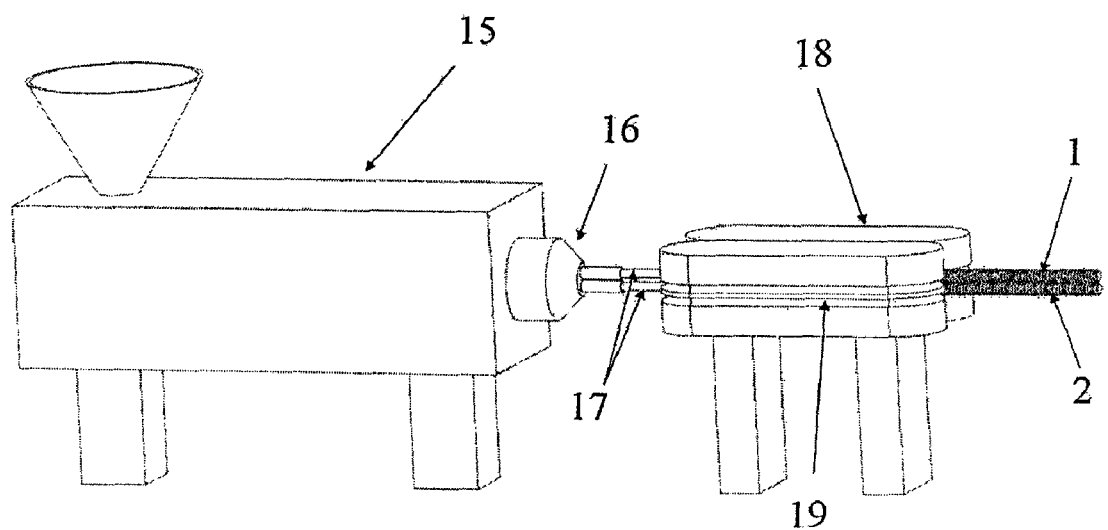
FIG. 8 shows the extrusion system for moulding the two sheaths.

With reference to FIGS. 2 and 8, two smooth tubes 17 are extruded simultaneously, by means of an extruder 15, a double extrusion head 16 allowing two smooth tubes to be obtained at the extruder outlet. These two smooth tubes of thermoplastic material are for example made of polypropylene, with a minimum extrusion temperature of approximately 190° C. These two smooth tubes 16 are subsequently shaped in a moulder 18 by means of two sets of moulds in the shape of half-shells 19 fitted with two parallel ringed profiles 31, 32, which proceed in the direction of extrusion and are paired longitudinally along the smooth tubes 17 in the mating plane 27. During moulding, the smooth tubes are blown out against the walls of the moulds so as to provide them with a ringed wall and to create the material bridges 33 separated by the empty spaces 35, between the rings 41 of the first tube and the rings 42 of the second tube, by opening 21 or closing 22 respectively, between the two ringed profiles 31, 32, material passages formed in the mating plane 27 of two paired moulds. The two ringed profiles 31, 32 of two paired moulds thus comprise clear spaces 21 which are formed in an indented manner relative to portions 22 which come into contact with one another in the mating plane 27, so as to form respectively, during moulding, the material bridges 33 separated by the empty spaces 35.

These two smooth tubes 17 are cooled against the walls of the half-shells 19. This moulding process makes it possible to obtain the two interconnected 4 ringed sheaths 1, 2.

Figure 7:
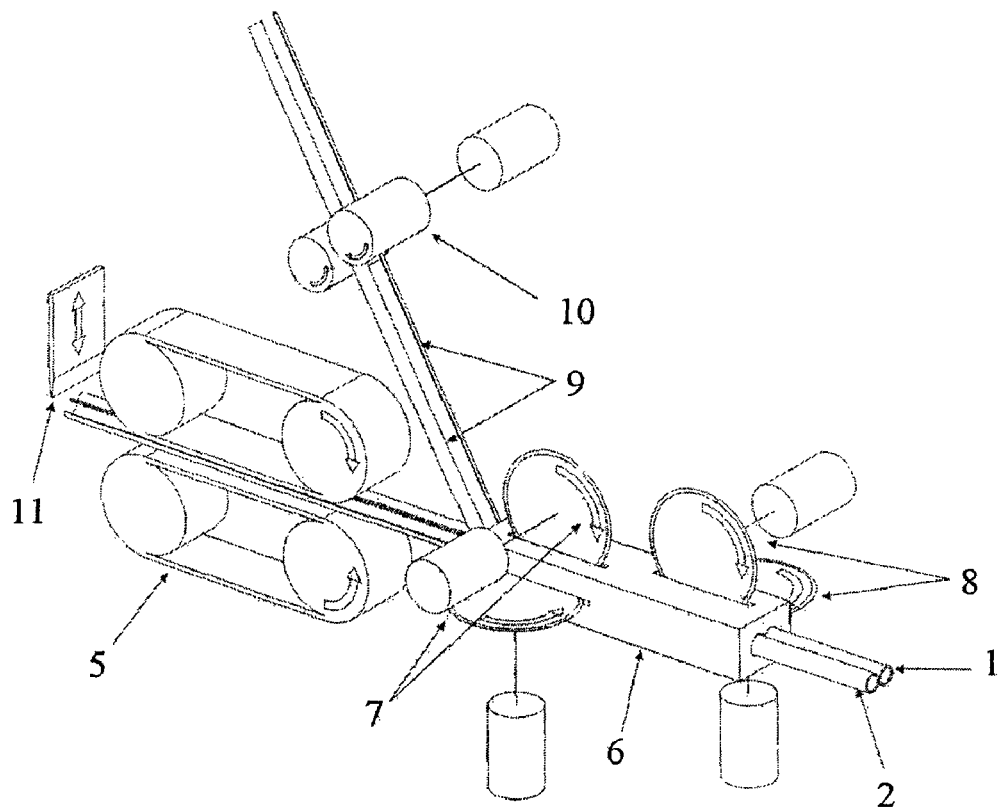
FIG. 7 is a motion diagram of the cutting system for longitudinally cutting the two sheaths.

With reference to FIG. 7, a puller 5 conveys the two extruded sheaths into a cutting system 6. The external sheath 1 is cut longitudinally by a set of two rotating blades 8, and the internal sheath 2 is likewise cut in the longitudinal direction by a set of two rotating blades 7, in such a way that two material strips 9 are removed respectively from each of the sheaths 1, 2 to form an opening 28. A puller 10 recovers these strips for recycling. The two cut-out ringed sheaths 1, 2 are cut to length by a cutting system 11, of the guillotine type or otherwise.

Figure 9:
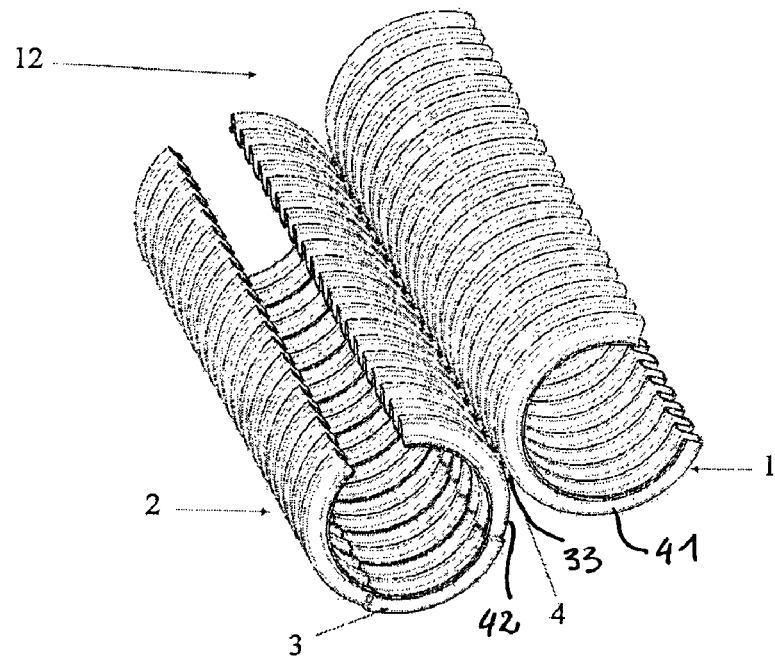
FIG. 9 shows the protective sheath obtained in this way, i.e. the two cut-out and connected sheaths.

With reference to FIG. 9, the profile of the internal sheath 2 has an added thickness 3 with a height equal to the wall thickness of the external sheath 1. This added thickness extends over a portion of the internal sheath 2 substantially equal to the portion of the strip removed from the external sheath, so as to obtain a protective sheath 12 with a circular cross-section after mounting.

Figure 10:
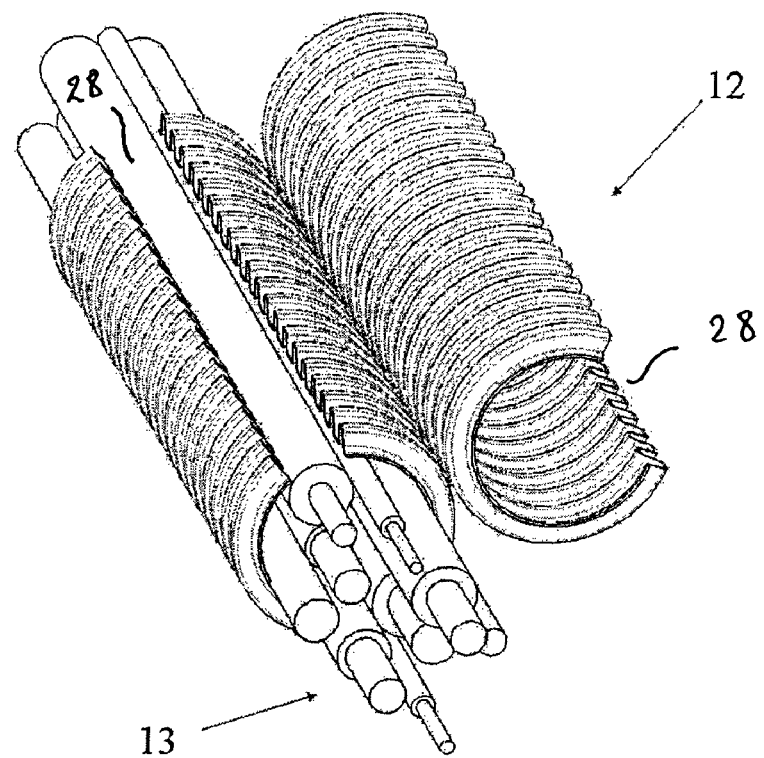
FIG. 10 shows the first phase of mounting the sheath on the bundle of cables.

With reference to FIG. 10, the protective sheath 12 obtained in this manner is placed on the cabling 13 which is to be protected. The width of the slot provided in the internal sheath 2 makes it easier to place said sheath on the cabling 13, while guaranteeing that the protective sheath 12 will grip thereon throughout the duration of the mounting.

Figure 11:
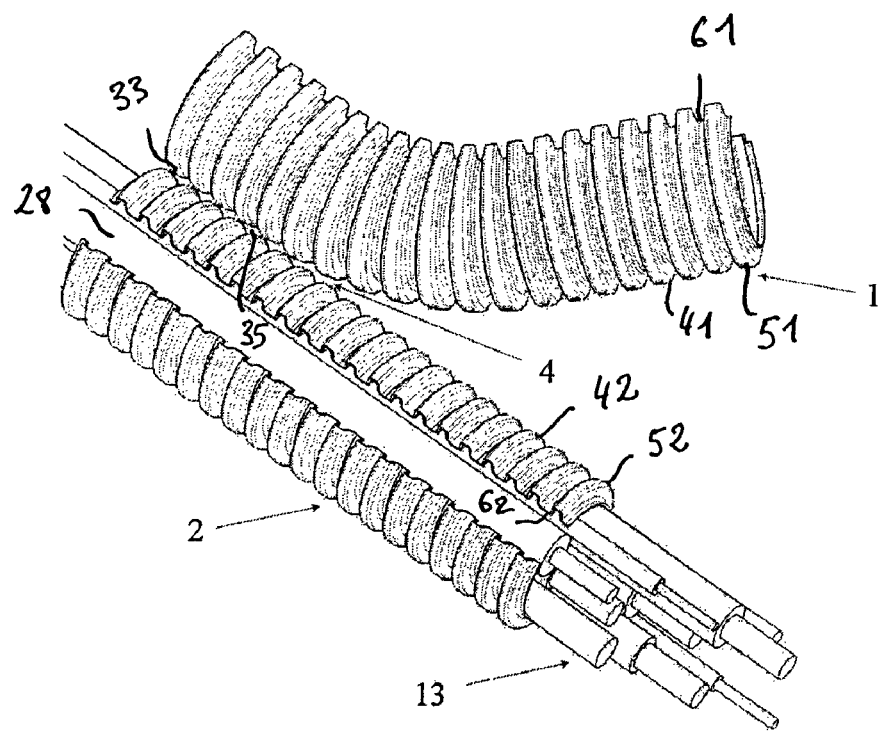
FIG. 11 shows the phase of separating the two sheaths.

With reference to FIG. 11, the external sheath 1 is subsequently separated from the internal sheath 2 by the operator, who breaks the connection 4 between the two sheaths 1, 2.

Figure 12:
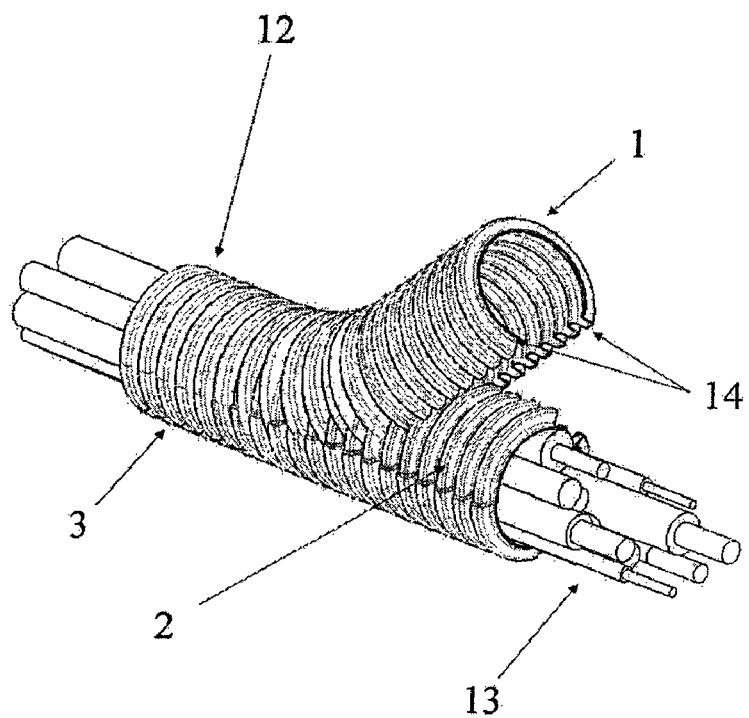
FIG. 12 shows the phase of closing the protective sheath.

With reference to FIG. 12, the external sheath 1 is placed on the internal sheath 2 by the operator, each end of the external sheath 1 created by the cut being applied to the added thickness 3 of the internal sheath 2 in such a way as to obtain a protective sheath 12 with a circular cross-section.

The invention claimed is:

1. Assembly of two ringed sheaths ready to be used to make a single ringed sheath around a bundle of electric cables comprising two ringed-wall tubes, the two tubes being interconnected by material bridges separated by empty spaces, formed between the rings of the first tube and the rings of the second tube, and having an opening corresponding to a longitudinal strip which is cut out and removed;
   a connection alternating between said material bridges and said empty spaces wherein said connection is such that the force necessary for separating the two ringed sheaths is between 8 N and 20N.

2. Assembly according to claim 1, wherein said connection has chamfers to make it easier for the material to pass in the region of a connection.

3. Assembly according to claim 2, wherein said chamfers are at 45° in the depth of said connection.

4. Assembly according to claim 1, wherein said first tube has an added thickness with a height equal to the wall thickness of the second tube.

5. Assembly according to claim 4, wherein said added thickness extends over a portion of said second tube substantially equal to the portion of the strip removed from the external sheath.

6. Assembly of two ringed sheaths ready to be used to make a single ringed sheath around a bundle of electric cables comprising a ringed-wall internal tube and a ringed-wall external tube, the shape and diameter of the internal tube being adapted to be placed into the external tube and the external height and width of the rings of the internal tube being less than the internal height and width of the rings of the external tube, the two tubes being interconnected by material bridges connecting peaks of the respective rings and separated by empty spaces formed between the rings of the first tube and the rings of the second tube, and having an opening corresponding to a longitudinal strip which is cut out and removed, wherein the connection between said internal and external tubes is such that the force necessary for separating the two ringed sheaths is between 8 N and 20 N.

7. Assembly according to claim 6, wherein said connection has chamfers to make it easier for the material to pass in the region of a connection.

8. Assembly according to claim 7, wherein said chamfers are at 45° in the depth of said connection.

9. Assembly of two ringed sheaths ready to be used to make a single ringed sheath around a bundle of electric cables comprising a ringed-wall internal tube and a ringed-wall external tube, the shape and diameter of the internal tube being adapted to be placed into the external tube and the external height and width of the rings of the internal tube being less than the internal height and width of the rings of the external tube, the two tubes being interconnected by material bridges connecting peaks of the respective rings and separated by empty spaces formed between the rings of the first tube and the rings of the second tube, and having an opening corresponding to a longitudinal strip which is cut out and removed, wherein said first tube has an added thickness with a height equal to the wall thickness of the second tube.

10. Assembly according to claim 9, wherein said added thickness extends over a portion of said second tube substantially equal to the portion of the strip removed from the external sheath.

* * * * *